United States Patent [19]

Pavel

[11] Patent Number: 6,034,017
[45] Date of Patent: Mar. 7, 2000

[54] USE OF PHOSPHROUS TO ENHANCE THE ACID SITES OF FCC CATALYSTS

[75] Inventor: Stephen K. Pavel, Kingwood, Tex.

[73] Assignee: Coastal Catalyst Technology, Inc., Houston, Tex.

[21] Appl. No.: 09/079,100

[22] Filed: May 14, 1998

Related U.S. Application Data

[63] Continuation-in-part of application No. 09/055,690, Apr. 6, 1998.

[51] Int. Cl.[7] .................................................. B01J 20/34
[52] U.S. Cl. ................................................. 502/27; 502/22
[58] Field of Search .......................................... 502/22, 27

[56] References Cited

U.S. PATENT DOCUMENTS

| | | | |
|---|---|---|---|
| 3,122,510 | 2/1964 | Burk, Jr. et al. | 252/413 |
| 3,122,511 | 2/1964 | Foster | 252/413 |
| 3,147,228 | 9/1964 | Erickson et al. | 252/412 |
| 3,150,104 | 9/1964 | Lehman | 252/415 |
| 3,182,025 | 5/1965 | Simantel | 252/415 |
| 3,219,586 | 11/1965 | Erickson | 252/415 |
| 4,101,444 | 7/1978 | Burk et al. | 252/411 |
| 4,163,709 | 8/1979 | Burk et al. | 208/120 |
| 4,163,710 | 8/1979 | Burk et al. | 208/120 |
| 4,243,550 | 1/1981 | Burk et al. | 252/412 |
| 4,318,799 | 3/1982 | Yoo | 208/114 |
| 4,319,983 | 3/1982 | Yoo | 208/114 |
| 4,461,845 | 7/1984 | Dessau et al. | 502/27 |
| 4,686,197 | 8/1987 | Elvin | 502/22 |
| 4,888,316 | 12/1989 | Gardner et al. | 502/20 |

*Primary Examiner*—Thomas Dunn
*Attorney, Agent, or Firm*—Browning Bushman

[57] ABSTRACT

The present invention discloses aqueous methods for enhancing the acid sites of fluid catalytic cracking (FCC) catalysts. The methods comprise the steps of contacting an FCC catalyst, either spent or fresh, with an aqueous solution comprising water, and a source of both phosphorus and aluminum. Optionally the solution includes sulfurous or sulfuric acid. The phosphorus is provided by phosphoric acid, phosphorous acid or ammonium dihydrogen phosphate. The aluminum is provided by an aluminum source selected from the group consisting of the alumina trihydrates and aluminum oxide. Chloride contamination of the aluminum source should be minimal, preferably less than about 1000 ppm chloride, more preferably less than about 200 ppm chloride. The pH of the aqueous solution is adjusted to about 3–12 by the addition of a sufficient quantity of an aqueous ammonium solution. The FCC catalyst is added to this solution, preferably with stirring, in a weight ratio of about 1 part catalyst to about 1–10 parts water to prepare an aqueous slurry. Upon stabilization of the pH of the aqueous slurry, enhancement of the acid sites of the catalyst is achieved and the catalyst may be separated from the slurry and, if desired, washed. This simple, aqueous process reduces the level of many metal poisons, including nickel and vanadium, on the FCC catalyst and produces a catalyst having an enhanced number of acid reaction sites.

26 Claims, 4 Drawing Sheets

USE OF PHOSPHROUS TO ENHANCE THE ACID SITES OF FCC CATALYSTS

This application is a continuation-in-part of U.S. patent application Ser. No. 09/055,690 filed Apr. 6, 1998.

BACKGROUND IN THE INVENTION

I. Field of the Invention

The present invention generally relates to methods for preparing fluid catalytic cracking (FCC) catalysts having enhanced acid sites. More specifically, the present invention is directed to aqueous methods for preparing improved FCC catalysts by contacting a catalyst with an aqueous solution including sources of both phosphorus and aluminum having specific characteristics and under specified conditions to enhance the acid sites of the catalyst.

II. Description of the Background

Catalytically controlled processes, including fluid catalytic cracking (FCC), are valuable refining processes employed to upgrade heavy hydrocarbons to higher valued products. In particular, the cracking of hydrocarbon feedstocks to produce hydrocarbons of preferred octane rating which boil in the gasoline range is widely practiced. This cracking uses a variety of solid catalysts typically comprising at least one synthetic crystalline material to give more valuable end products. Cracking is ordinarily employed to produce gasoline as the most valuable product. Cracking is generally conducted at temperatures of about 750–1100° F., preferably about 850–950° F. and at pressures up to about 2000 psig, preferably about atmospheric to about 100 psig. In cracking, the feedstock is usually a petroleum hydrocarbon fraction such as straight run or recycled gas oils or other normally liquid hydrocarbons boiling above the gasoline range.

Over 1100 tons per day of FCC catalyst is used worldwide in over 200 Fluid Catalytic Cracking Units (FCCUs). During the cracking reaction, the catalyst is contaminated by elements deposited from feedstocks. Some contaminants, like the alkali metals, deactivate the catalyst without changing the product distribution. Others, however, including iron, nickel, vanadium and copper, effectively poison the catalyst by altering the selectivity and activity of the cracking reactions if allowed to accumulate on the catalyst. A catalyst, so poisoned with these metals, produces a higher yield of coke and hydrogen at the expense of the more desirable gasolines and butanes. Examples of such poisoning may be found in U.S. Pat. No. 3,147,228 where the yield of desirable butanes, butylenes and gasoline dropped from about 59 to about 49 volume percent as the contamination of the catalyst with nickel and vanadium increased, from 55 ppm to 645 ppm nickel and 145 ppm to 1480 ppm vanadium. Because many cracking units are limited by coke burning or gas handling facilities, increased coke or gas yields require a reduction in conversion or throughput to stay within the unit capacity.

In FCCUs, the bulk of contaminant elements from the feedstock remain in the circulating catalyst system. Through the cycles of cracking, fresh catalyst deactivation is caused by contaminant blockage of active sites by metals, including nickel, vanadium, copper and iron. Deactivation may also occur as the result of steam catalyzed by contaminants such as vanadium and sodium. To compensate for decreased FCC feedstock conversion and product selectivity, a portion of the circulating equilibrium catalyst is regularly withdrawn and replaced by fresh catalyst added to the system. This withdrawn or spent catalyst contaminated with various metals must then be properly disposed of.

Both because of the expense involved in replacing spent catalyst with fresh catalyst and because of the expense involved with the environmentally safe disposal of metal-contaminated catalyst, there have been many efforts to demetallize and reuse the contaminated catalyst. In conventional demetallization processes, portions of the metal contaminants are removed from the spent FCC catalyst by pyrometallurgical methods, e.g., calcining, sulfiding, nitrogen stripping and chlorinating, followed by hydrometallurgical methods, e.g., leaching, washing and drying, to produce a demetallized spent catalyst for reuse in the FCCU. Such a demetallization (DEMET) process is described in U.S. Pat. No. 4,686,197, incorporated herein by reference. The '197 patent describes an improved demetallization process. Also referenced are prior demetallization processes which include the chlorination at elevated temperatures of alumina, silica alumina and silica catalysts contaminated with metals. See, for example, U.S. Pat. Nos. 3,150,104; 3,122,510; 3,219,586; and 3,182,025. Also referenced are demetallization processes which do not primarily involve chlorination of the catalyst. See, for example, U.S. Pat. Nos. 4,101,444; 4,163,709; 4,163,710; and 4,243,550.

Prior demetallization processes, such as the DEMET process described in the '197 patent have most frequently employed calcining and sulfiding steps performed at about 787° C. followed by chlorination at 343° C. The offgases from the reactor are scrubbed, while the removed contaminant metals are precipitated and filtered for disposal in the same manner used for spent catalyst or disposed through any acceptable Best Demonstrated Available Technology (BDAT) method for the recycling of metals.

The recycling of demetallized spent FCC catalyst has reduced the requirements for fresh catalyst additions, reduced the generation of catalyst fines and reduced the disposal problem of spent catalyst. Conventional demetallization processes remove contaminants known to be detrimental to conversion, to product selectivity and to the mechanical performance of the FCC.

While the DEMET process based upon the '197 patent and the prior processes described therein have provided methods for demetallization of spent FCC catalyst, those methods have not been entirely or universally acceptable. Operating conditions are severe and must be strictly maintained. Therefore, the process has found only limited use. For these and other reasons, there has been a long felt but unfulfilled need for a more economical, more efficient, easier and safer method for demetallizing FCC catalysts and for enhancing the acid sites thereon. The present invention solves those needs.

SUMMARY OF THE INVENTION

The present invention is directed to processes for enhancing the acid sites of fluid catalytic cracking (FCC) catalysts. More particularly, the invention is directed to aqueous processes for treating either spent or fresh FCC catalysts to enhance the acid sites, thus improving the catalyst reactivity and selectivity.

In the processes of the present invention, spent or fresh FCC catalyst is added to an aqueous solution to produce an aqueous slurry. The aqueous solution comprises water, phosphorus, aluminum and optionally sulfurous or sulfuric acid. The phosphorus is provided by phosphorus acid, phosphoric acid or ammonium hydrogen phosphate. The aluminum is provided from an aluminum source selected from the group consisting of aluminum trihydroxide, alumina trihydrate, gibbsite and aluminum oxide and is characterized by a low level of chloride contamination. In fact, chloride contamination of the aluminum source should be not more than about 1000 ppm; preferably the aluminum source should have less than about 200 ppm chloride.

The aqueous solution preferably comprises equal concentrations of phosphorus and aluminum where each is present in the range of about 0.1–3.0 percent-by-weight, preferably in the range of about 0.2–1.5 percent-by-weight, more preferably about 0.7–1.0 percent-by-weight, with respect to the solution. If present, the sulfurous or sulfuric acid should also be present at the same concentration. The pH of the solution should be in the range of about 3.0 to 12.0, preferably from about 3.25 to about 5.0, and is adjusted by the addition of sufficient quantity of ammonium hydroxide or ammonium sulfate to achieve the desired pH.

While the process is intended for the treatment of spent FCC catalyst, it has been found that fresh catalyst will also benefit from the process. The FCC catalyst is added to the aqueous solution in a weight ratio of about 1 part catalyst to 1–10 parts water, preferably in a ratio of about 1 part catalyst to about 4–10 parts water. In order to produce the desired aqueous slurry, catalyst is typically added to the aqueous solution with stirring.

The reaction proceeds quickly. Stirring of the slurry should be continued until the pH stabilizes. Upon stabilization of the pH, the enhanced catalyst is separated from the slurry. While washing is not necessary, it may be desirable to wash the separated catalyst with successive aliquots of wash water until the eluted wash water aliquot contains less than about 100 ppm chloride.

FCC catalysts, whether spent or fresh, treated by the forgoing process have been found to provide improved reactivity and selectivity, apparently as the result of added or enhanced acid sites made available for reaction on the catalyst surface. These improvements have been achieved without requiring the severe and expensive pyrometallurgical steps of conventional demetallization processes. However, the aqueous processes of the present invention may also be used to treat spent FCC catalysts which have previously been demetallized by conventional pyrometallurgical and/or hydrometallurgical processes. Thus, the long felt, but unfulfilled need for a more efficient demetallization process has been met.

The processes of the present invention produce improved catalysts exhibiting higher activity and higher stability than catalysts produced by prior processes. The catalysts produced by the present processes are more resistant to deactivation and show improved stability. Thus, the production of coke and hydrogen are both minimized and the throughput of the catalytic cracker can be increased. These and other meritorious features and advantages of the present invention will be more fully appreciated from the following detailed description and claims.

BRIEF DESCRIPTION OF THE DRAWINGS

Other features and intended advantages of the present invention will be more readily apparent by the references to the following detailed description in connection with the accompanying drawings, wherein.

Figure 1:
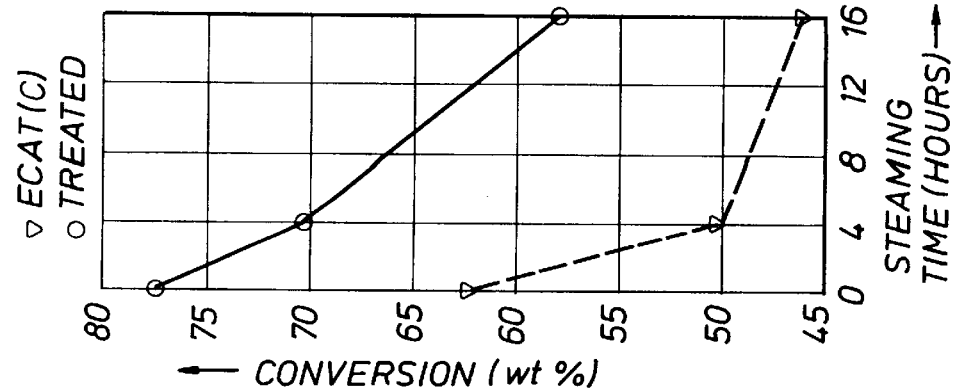
FIGS. 1–4 illustrate the improvement in activity and resistance to hydrothermal deactivation exhibited by four different catalysts (characterized by widely varying equilibrium metal content) after treatment in accord with the methods of the present invention.
Figure 2:
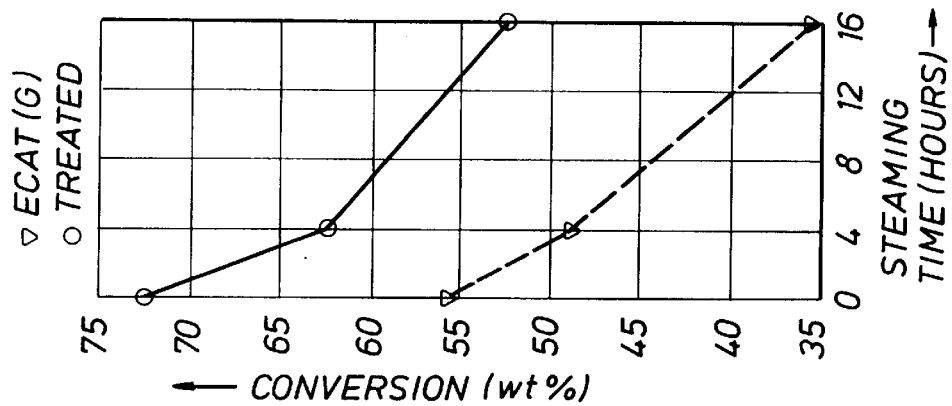
Figure 3:
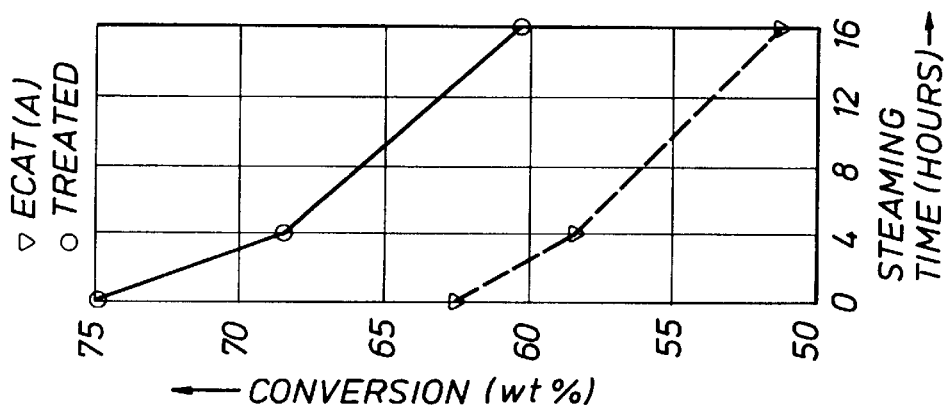
Figure 4:
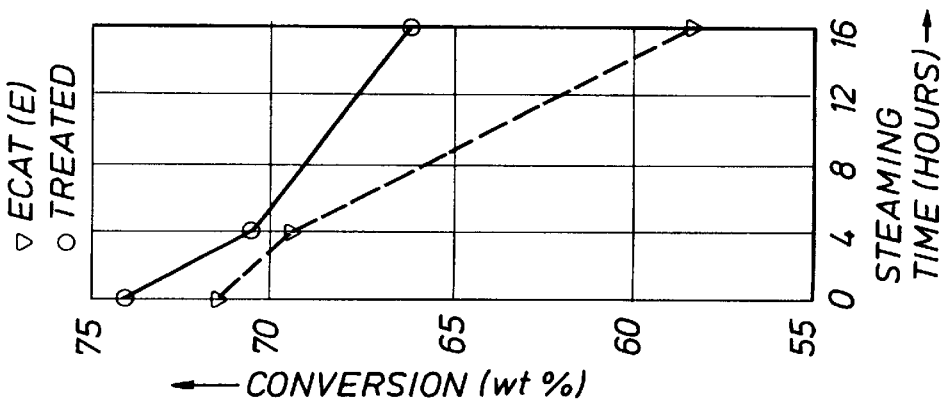

While the invention will be described in connection with the presently preferred embodiments, it will be understood that it is not intended to limit the invention to those embodiments. On the contrary, it is intended to cover all alternatives, modifications and equivalents as may be included in the spirit of the invention as defined in the appended claims.

DETAILED DESCRIPTION OF THE PREFERRED EMBODIMENTS

The present invention provides improved methods for enhancing the acid sites of fluid catalytic cracking (FCC) catalysts, particularly spent catalysts. In the methods of the present invention, the FCC catalyst is treated in an aqueous solution including sources of both phosphorus and aluminum having less than about 1000 ppm chloride as a trace element under specified conditions.

In the methods of the present invention, an aqueous solution comprising water, about 0.1–3.0 percent-by-weight phosphoric acid, about 0.1–3.0 percent-by-weight aluminum and optionally about 0.1–3.0 percent-by-weight sulfurous acid is prepared. Preferably the solution comprises about 0.2–1.5 percent-by-weight phosphorus and aluminum. More preferably both the phosphorus and aluminum are present in a concentration of about 0.7–1.0 percent-by-weight, most preferably at about 8000 ppm. The sulfurous or sulfuric acid optionally included is preferably at the same concentration as the phosphorus and aluminum.

The phosphorus source is preferably selected from the group consisting of phosphorous acid, phosphoric acid and ammonium dihydrogen phosphate and most preferably, comprises phosphoric acid. The aluminum is provided by an aluminum source selected from the group consisting of the aluminum trihydrates and aluminum oxides and, further, should be characterized by a low chloride level, preferably less than about 1000 ppm chloride as a trace constituent. The aluminum trihydrates include gibbsite alumina, boehmite alumina, bayerite alumina, diaspore alumina and derivatives thereof. The preferred aluminum source is alumina trihydrate, most preferably gibbsite alumina, and contains less than about 200 ppm chloride as a trace constituent.

In the process of the present invention, the pH of the aqueous solution of acid and aluminum is adjusted to about 3–12, most preferably to about 3.25–5.0 by the addition of ammonium hydroxide. While it is preferred that the pH be adjusted before the addition of catalyst to the solution, in an alternative method the catalyst may be added before the pH adjustment.

The FCC catalyst is added to the pH adjusted aqueous solution in a weight ratio of about one part catalyst to about 1–10 parts water to produce an aqueous slurry. In the more preferred methods of the present invention, the ratio of catalyst to water is about 1 part catalyst to about 4–10 parts water.

While it has been found that the acid sites of fresh catalyst may be improved by the methods of the present invention, the present invention is particularly useful for the processing of spent catalyst. In fact, the processes of the present invention have been found most useful for the processing of spent catalysts heavily contaminated by nickel. While it is not necessary to treat a spent catalyst by conventional pyrometallurgical or hydrometallurgical demetallization processes, e.g., by processes such as those disclosed in U.S. Pat. No. 4,686,197 which is incorporated herein by reference, the present methods may be used to further enhance the acid sites of spent catalysts which have been so treated.

After the addition of catalyst to the pH adjusted aqueous solution, the resulting slurry should be stirred or otherwise mixed for a time sufficient for the pH of the solution to stabilize. Stabilization will typically occur in a pH range of about 3.25 to 5.0. The pH may be monitored by any conventional means, e.g., a standard pH probe. Stabilization of the pH typically occurs after stirring for a time of about 1–10 minutes, commonly about 3–5 minutes. It has been found that additional stirring after stabilization of the pH provides no significant additional improvement in the results achieved.

After the pH of the aqueous slurry has stabilized, the treated catalyst may be separated from the aqueous solution by any conventional means, e.g., filtration. Washing of the filtered catalyst has been found to be unnecessary. However, if washing is desired, the filtered catalyst may be washed with water, preferably until the eluted wash water shows less than about 100 ppm chloride.

The foregoing method significantly enhances the acid sites of FCC catalysts. FCC catalysts, whether spent or fresh, treated in accord with the foregoing procedure show higher activity and higher stability than untreated catalysts or spent catalysts treated by prior processes. The foregoing method will now be described in connection with several specific examples. The following specific examples illustrate the methods of the foregoing process and provide illustrative examples of the improved results achieved therewith.

Catalyst Treatment Procedure

EXAMPLE 1

An aqueous solution containing phosphoric acid and aluminum was prepared by adding to a clean beaker 2400 ml of water and a stirring bar. With constant stirring, 13 ml of phosphoric acid (99.99 percent acid) and 21 grams of aluminum trihydroxide were added. The resulting aqueous solution was stirred for five minutes or until the aluminum was dissolved. The pH of the solution was raised to about 5.0 by the addition of ammonium hydroxide while continuing to stir. To the pH adjusted solution was added 300 grams of catalyst with continuous stirring to produce an aqueous slurry. The pH of the aqueous slurry was monitored and, upon stabilization of the pH, the slurry was filtered to separate the treated catalyst from the aqueous solution. The filtered, treated catalyst was washed with two successive washes, each comprising about 1200 ml of water.

EXAMPLE 2

The procedure of Example 1 was repeated with the exception that 13 ml phosphorous acid (99.99 percent acid) was substituted for the phosphoric acid.

EXAMPLE 3

The procedure of Example 1 was repeated except that 25 grams ammonium dihydrogen phosphate was substituted for the phosphoric acid.

EXAMPLE 4

The procedure of Example 1 was repeated except that the solution containing phosphorus and aluminum also included 324 ml of sulfurous acid (6 percent acid).

EXAMPLE 5

Example 1 was repeated except that the amount of phosphorus was doubled.

EXAMPLE 6

Example 1 was repeated except that the amount of aluminum as doubled.

EXAMPLE 7

Example 1 was repeated except that the amount of both phosphorus and aluminum were doubled.

A variety of catalysts have been treated with the foregoing processes. Those catalysts included a fresh catalyst (FCAT) and equilibrium spent catalyst (ECAT) from several different sources. These treated catalysts, along with comparisons of untreated fresh and spent catalyst and catalyst treated by conventional DEMET procedures (DCAT) were tested to predict performance.

Test Methods

The expected performance of catalysts treated by the foregoing procedure have been determined using conventional micro activity testing (MAT) and steaming conditions which are known and used by those of skill in the art to test fresh, spent and demetallized catalysts. In these procedures, catalyst was treated with 100 percent steam at a temperature of about 787° C. (1450° F.). A comparison of the results before steaming and after 4 hours of steaming provides an indication of the hydrothermal stability of the catalyst. In addition to those conventional steaming results, Applicant has employed a more rigorous test by continuing to steam the catalyst for 16 hours. Alternative tests which could be used for the same determination include fixed fluid bed, FCCU pilot plant, modified MAT and cyclic deactivation testing.

It has been found that a catalyst which can survive the severity of temperature, steam and time in the foregoing MAT test would be expected to perform relatively the same in cyclic deactivation or pilot plant testing. Accordingly, in order to provide an indication of catalyst stability, conventional steaming and MAT tests including both 4 hour and 16 hour steaming conditions, have been performed on catalysts treated by the foregoing procedure. For comparison, the same tests were performed on untreated fresh and equilibrium spent catalysts and on spent catalyst treated with conventional DEMET methods.

Full yield MAT tests were conducted on a variety of fresh and equilibrium catalysts and on catalysts (either fresh or equilibrium) treated in accord with the present invention. Tests were conducted prior to steaming and after steaming for 4 and 16 hours with 100 percent steam at 787° C. (1450° F.). Catalysts having a range of metal contamination were employed. Illustrative of that contamination is the concentration of nickel and vanadium in the equilibrium catalysts which ranged from 2500 ppm to 1.6 percent as illustrated in Table 1.

TABLE 1

| Catalyst | Metal Content (ppm) | | |
|---|---|---|---|
| | Nickel | Vanadium | Ni + V |
| E | 510 | 1990 | 2500 |
| A | 7350 | 797 | 8147 |
| G | 4620 | 5220 | 9840 |
| C | 15550 | 445 | 15995 |

These tests provide ample data to make an accurate determination of the resistance to hydrothermal deactivation exhibited by fresh, spent and treated catalyst. The MAT results at constant conditions discussed below and illustrated in the accompanying figures and tables show the improvement in catalyst performance achieved by treatment of these catalysts with the methods of the present invention.

Significantly improved conversion is observed when using the methods of the present invention with equilibrium catalysts characterized by a wide range of metal contamination levels. FIGS. 1–4 illustrate the improved conversion achieved when catalysts E, A, G and C of Table 1 (initially contaminated with levels of nickel and vanadium ranging from 0.25–1.60 percent-by-weight) are treated with the methods of the present invention. After steaming for 16 hours, the treated catalysts showed significantly improved total conversion rates with improvements of about 8–18 percent absolute as compared to the total conversion rates for the untreated equilibrium catalysts.

Figure 7:
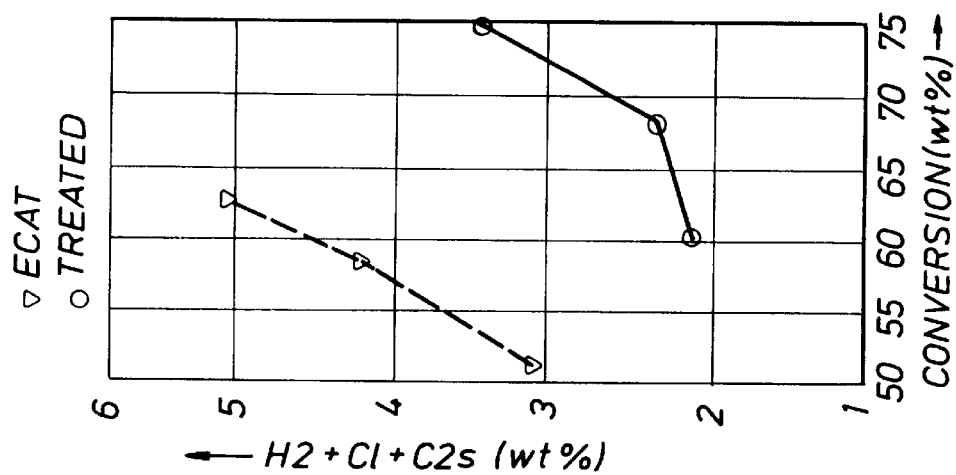
FIGS. 5–7 illustrate the improvement in gasoline, coke and gas selectivities, respectively, achieved with an equilibrium catalyst treated in accord with the methods of the present invention when compared to the untreated equilibrium catalyst after steaming for 0, 4 and 16 hours at 787° C. (1450° F.)
Figure 6:
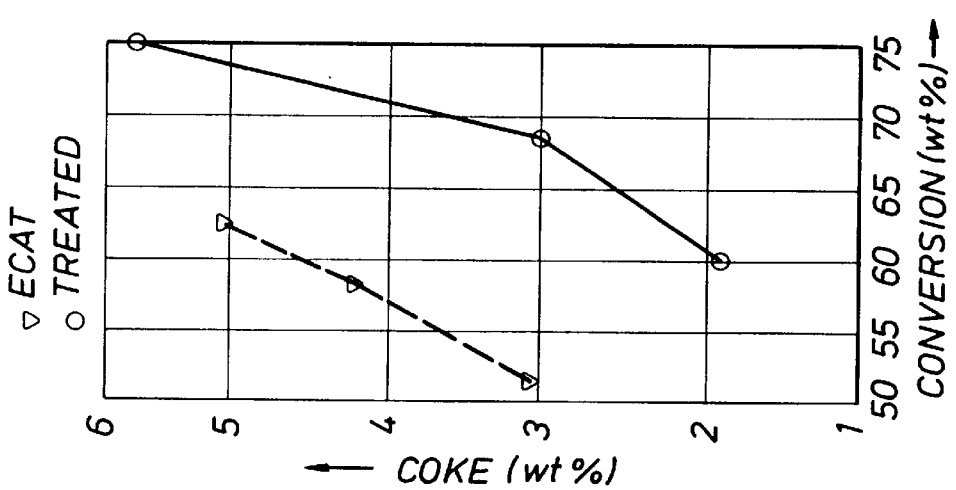
Figure 5:
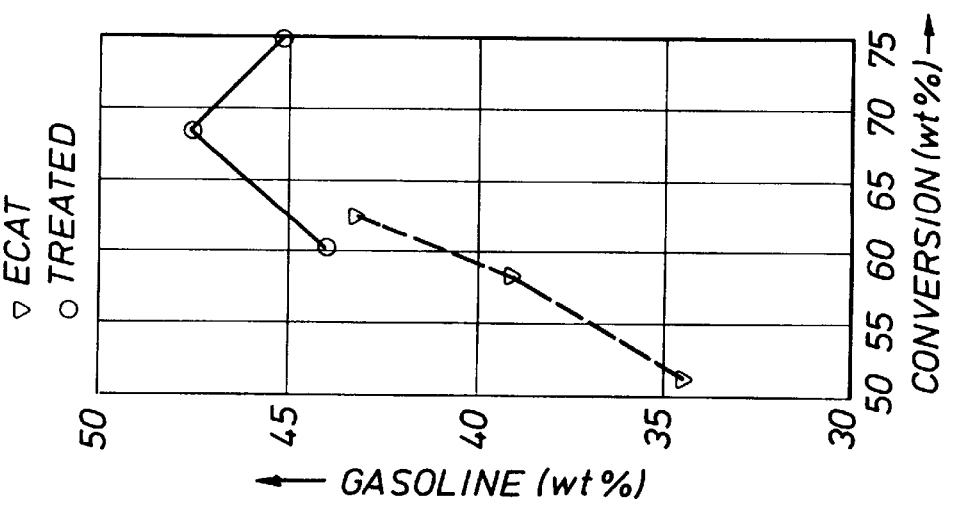

FIGS. 5–13 further illustrate the improvements achieved using illustrative equilibrium catalyst A (having a combined nickel and vanadium content of about 0.8 percent) treated in accord with the present invention. The figures compare the results achieved with untreated equilibrium catalyst A and with equilibrium catalyst A treated in accord with the present invention without steaming and after steaming for 4 and 16 hours as stated above. Selectivity for gasoline, coke and dry gas are all improved. FIG. 5 illustrates the increased conversion to gasoline achieved. FIGS. 6 and 7 illustrate the desirable reduction in the production of both coke and gas.

Figure 10:
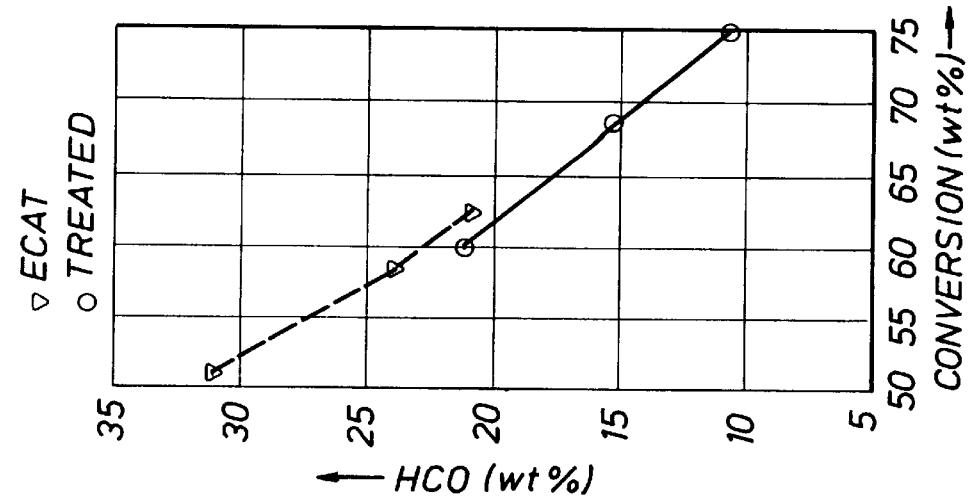
FIGS. 8–10 illustrate, respectively, the improved results for conversion to liquified petroleum gas (LPG), light crude oil (LCO) and heavy crude oil (HCO) achieved with an equilibrium catalyst treated in accord with the methods of the present invention when compared to the untreated equilibrium catalyst after steaming for 0, 4 and 16 hours at 787° C. (1450° F.)
Figure 9:
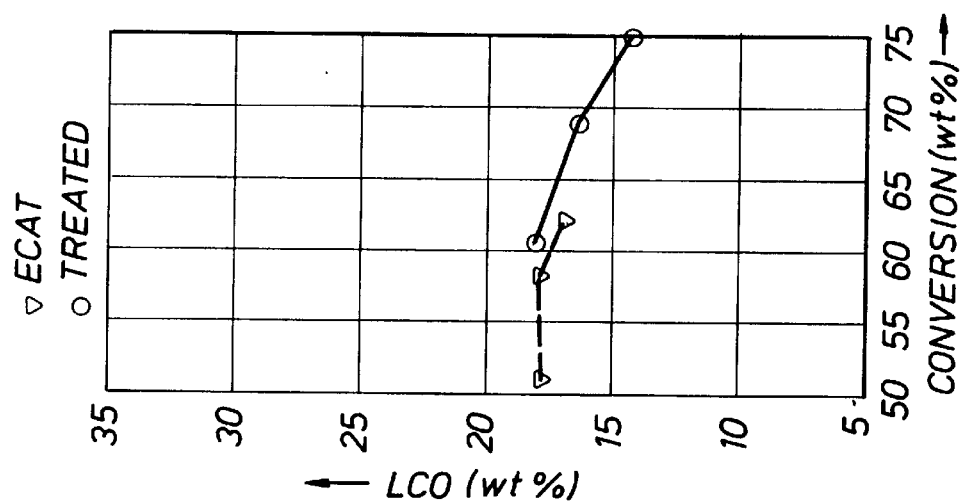
Figure 8:
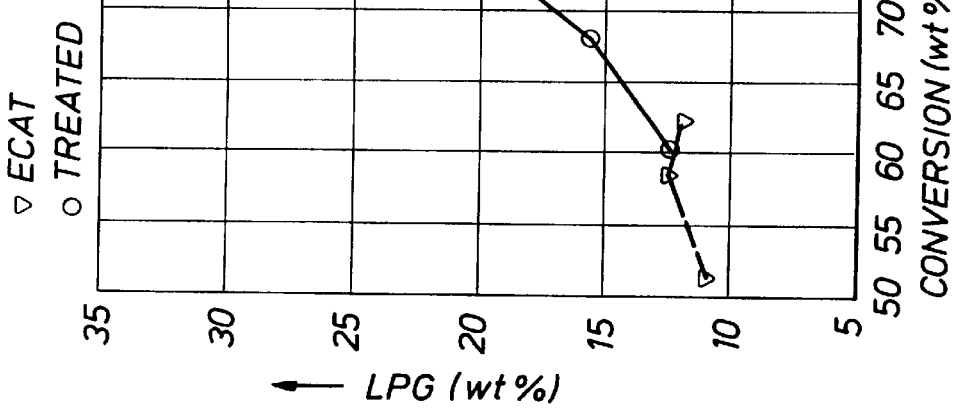

FIGS. 8–10 illustrate results after 0, 4 and 16 hours of steaming for treated and untreated equilibrium catalyst A. FIGS. 8 and 9 illustrate, respectively, improvements in the conversion to liquified petroleum gas (lpg) and light crude oil (LCO). With higher conversion, the LPG content is almost doubled after steaming for 16 hours while the LCO level remains nearly constant. FIG. 10 illustrates the desirable reduction in the conversion to heavy crude oil (HCO). With higher total conversion, the production of HCO is reduced by almost half after steaming for 16 hours.

Figure 13:
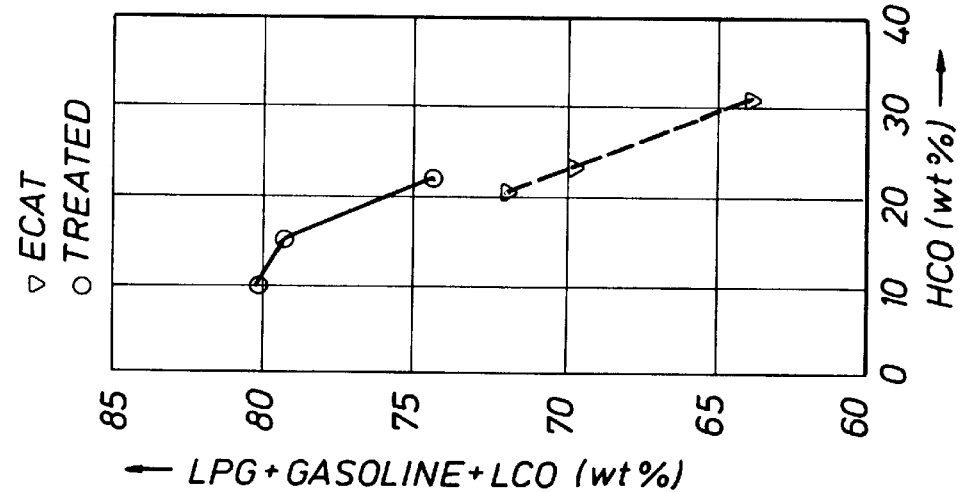
FIGS. 12 and 13 illustrate, respectively, the increased ratio of light to heavy crude oil (LCO/HCO) and LPG+ gasoline+LCO conversion achieved with an equilibrium catalyst treated in accord with the methods of the present invention when compared to the untreated equilibrium catalyst after steaming for 0, 4 and 16 hours at 787° C. (1450° F.).
Figure 12:
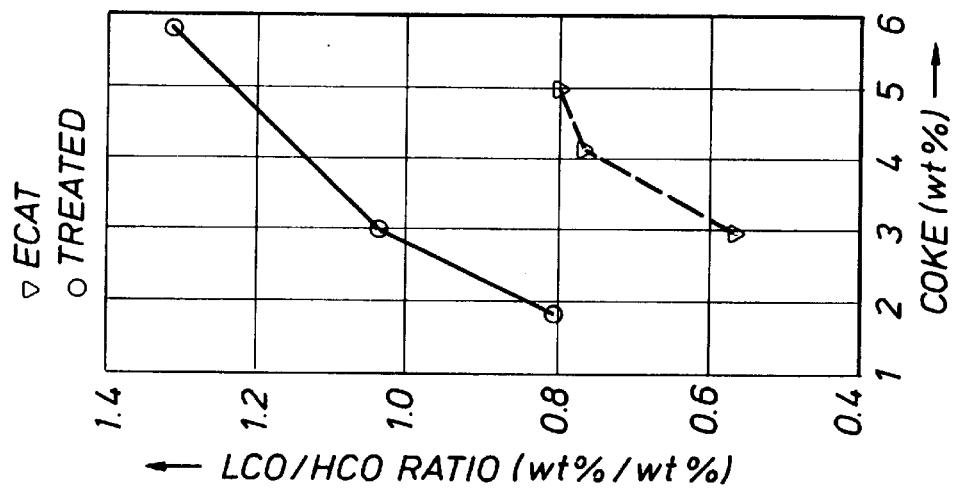
Figure 11:
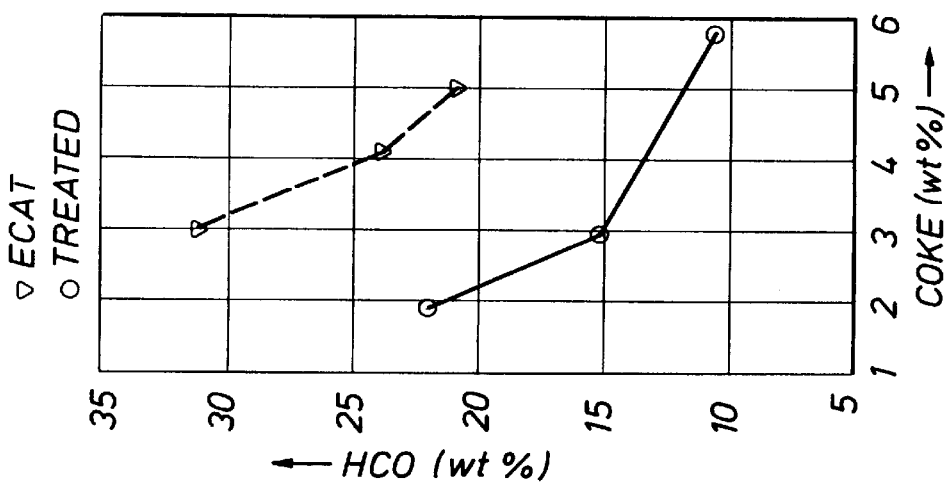
FIG. 11 illustrates the desirable reduction in conversion to heavy crude oil (HCO) achieved with an equilibrium catalyst treated in accord with the methods of the present invention when compared to the untreated equilibrium catalyst after steaming for 0, 4 and 16 hours at 787° C. (1450° F.)

FIG. 11 illustrates significant reduction in the production of heavy crude oil (HCO) with little increase in coke content when comparing untreated equilibrium catalyst A with the same catalyst treated in accord with the present invention. As can be seen, conversion to HCO is reduced almost by half through use of the present invention. FIG. 12 illustrates the beneficial increase in the ratio of light to heavy crude oil (LCO/HCO) achieved by use of the present invention. Finally, FIG. 13 illustrates the increased production of the most desirable products, i.e., liquified petroleum gas, gasoline and light crude oil by use of the present invention.

In summary, FIGS. 5–13 illustrate increased conversion and production of desirable end products with reduced production of undesirable products achieved with an equilibrium catalyst treated in accord with the methods of the present invention. Further, these figures illustrate consistent improvement found not only initially, but after steaming at 4 and 16 hours, thus indicating the improved hydrothermal stability which can be expected from these treated catalysts.

The improvements achieved using the methods of the present invention outlined in Example 1–7 above with the catalysts listed in Table 1 are illustrated in the following tables and comments.

Catalyst E characterized by low nickel and vanadium contamination (510 ppm Ni and 1990 ppm V) was used in a series of experiments. MAT tests were performed prior to steaming and after steaming at 4 and 16 hours with 100 percent steam at 787° C. (1450° F.) as discussed above. Tests were performed on the untreated equilibrium catalysts, on equilibrium catalysts treated by standard demetallization or by the methods of the present invention. The following tables present for comparison purposes the rate of conversion, together with the percentage production of dry gas, liquified petroleum gas (LPG), gasoline, light crude oil (LCO), slurry and coke. The results observed with untreated equilibrium catalyst E are summarized in Table 2. The results observed using equilibrium catalyst E subjected to a conventional demetallization technique are summarized in Table 3. Table 4 illustrates the results achieved by treating equilibrium catalyst E in accord with the methods of the present invention as set forth in Example 1 above. Finally, Table 5 illustrates the results achieved by treatment of equilibrium catalyst E by the method set forth in Example 2 above, preceded by a conventional demetallization treatment.

TABLE 2

| | Steaming at 1450° F. (Hours) | | |
|---|---|---|---|
| ECAT E | 0 | 4 | 16 |
| Conversion (%) | 71.4 | 69.5 | 58.2 |
| Dry Gas (%) | 2.5 | 3.0 | 2.3 |
| LPG (%) | 17.5 | 14.7 | 13.2 |
| Gasoline (%) | 43.8 | 44.5 | 37.5 |
| LCO (%) | 16.9 | 18.0 | 20.1 |
| Slurry (%) | 11.7 | 12.5 | 21.8 |
| Coke (%) | 7.6 | 7.3 | 5.2 |

TABLE 3

| | Steaming at 1450° F. (Hours) | | |
|---|---|---|---|
| DEMET | 0 | 4 | 16 |
| Conversion (%) | 74.0 | 70.3 | 66.5 |
| Dry Gas (%) | 2.3 | 2.0 | 1.7 |
| LPG (%) | 20.2 | 16.5 | 16.6 |
| Gasoline (%) | 44.3 | 48.2 | 45.5 |
| LCO (%) | 14.5 | 17.3 | 17.6 |
| Slurry (%) | 11.5 | 12.4 | 16.0 |
| Coke (%) | 7.2 | 3.5 | 2.7 |

TABLE 4

| Example 1 | Steaming at 1450° F. (Hours) | | |
|---|---|---|---|
| | 0 | 4 | 16 |
| Conversion (%) | 70.6 | 69.9 | 60.3 |
| Dry Gas (%) | 3.0 | 2.5 | 2.2 |
| LPG (%) | 17.0 | 13.1 | 8.8 |
| Gasoline (%) | 45.3 | 48.1 | 45.9 |
| LCO (%) | 15.8 | 17.1 | 19.9 |
| Slurry (%) | 13.6 | 13.0 | 19.9 |
| Coke (%) | 5.3 | 6.2 | 3.3 |

TABLE 5

| DEMET before Example 2 | Steaming at 1450° F. (Hours) | | |
|---|---|---|---|
| | 0 | 4 | 16 |
| Conversion (%) | 75.6 | 68.1 | 63.1 |
| Dry Gas (%) | 2.4 | 1.6 | 1.5 |
| LPG (%) | 19.2 | 14.2 | 12.3 |
| Gasoline (%) | 46.4 | 50.3 | 47.3 |
| LCO (%) | 14.8 | 17.7 | 18.0 |
| Slurry (%) | 9.6 | 14.2 | 18.9 |
| Coke (%) | 7.6 | 1.9 | 2.0 |

The above tables illustrate the significant improvement in total conversion observed with equilibrium catalyst treated in accord with the methods of the present invention. They also illustrate that the production of desirable products, e.g., gasoline, have been improved, while achieving a reduction in undesirable products, e.g., coke.

To illustrate the improvements achieved using the methods of the present invention as set forth in Examples 1–7 above, another series of tests were performed using equilibrium catalyst A from Table 1 having an average nickel and vanadium contamination of about 0.8 percent (7350 ppm Ni and 797 ppm V). In one instance, the equilibrium catalyst was calcined at 843° C. (1550° F.) for 4 hours and in another treated with a conventional demetallization process prior to treatment with the method of the present invention set forth in Example 1 above. Finally, it was seen that improved results were obtained by treating fresh catalyst with the method of the present invention. The results of these various treatments of catalyst A are illustrated in Tables 6–15.

TABLE 6

| ECAT A | Steaming at 1450° F. (Hours) | | |
|---|---|---|---|
| | 0 | 4 | 16 |
| Conversion (%) | 56.8 | 46.9 | 37.9 |
| Dry Gas (%) | 1.7 | 1.9 | 1.9 |
| LPG (%) | 12.8 | 9.4 | 6.9 |
| Gasoline (%) | 35.7 | 31.2 | 25.0 |
| LCO (%) | 21.6 | 22.6 | 20.4 |
| Slurry (%) | 21.6 | 30.5 | 41.7 |
| Coke (%) | 6.6 | 4.4 | 4.1 |

TABLE 7

| Example 1 | Steaming at 1450° F. (Hours) | | |
|---|---|---|---|
| | 0 | 4 | 16 |
| Conversion (%) | 73.3 | 65.2 | 56.2 |
| Dry Gas (%) | 3.0 | 3.2 | 2.2 |
| LPG (%) | 18.7 | 15.9 | 11.7 |
| Gasoline (%) | 40.1 | 40.7 | 38.0 |
| LCO (%) | 13.4 | 16.7 | 17.5 |
| Slurry (%) | 13.4 | 18.1 | 26.3 |
| Coke (%) | 11.4 | 5.5 | 4.3 |

TABLE 8

| Calcine before Example 1 | Steaming at 1450° F. (Hours) | | |
|---|---|---|---|
| | 0 | 4 | 16 |
| Conversion (%) | 74.8 | 68.5 | 60.4 |
| Dry Gas (%) | 3.1 | 2.3 | 1.9 |
| LPG (%) | 20.8 | 15.8 | 12.4 |
| Gasoiine (%) | 45.2 | 47.4 | 44.2 |
| LCO (%) | 14.3 | 16.1 | 17.7 |
| Slurry (%) | 10.9 | 15.4 | 21.9 |
| Coke (%) | 5.8 | 3.0 | 1.9 |

TABLE 9

| DEMET before Example 1 | Steaming at 1450° F. (Hours) | | |
|---|---|---|---|
| | 0 | 4 | 16 |
| Conversion (%) | 69.1 | 69.2 | 61.0 |
| Dry Gas (%) | 3.3 | 2.6 | 1.8 |
| LPG (%) | 16.0 | 15.3 | 13.4 |
| Gasoline (%) | 42.6 | 47.6 | 44.7 |
| LCO (%) | 14.7 | 15.0 | 16.6 |
| Slurry (%) | 16.2 | 15.8 | 22.4 |
| Coke (%) | 7.1 | 3.7 | 1.1 |

Tables 6–9 illustrate the improved conversion and improved production of desirable products, most notably LPG and gasoline, observed with the methods of the present invention. Table 6 illustrates conversion and MAT results using untreated equilibrium catalyst A. The improved results obtained upon treatment of the catalyst with the method Example 1 is illustrated in Table 7. Tables 8 and 9, respectively, illustrate the further improvement achieved when the method of Example 1 is practiced after, respectively, calcining the sample at 843° C. (1550° F.) for 4 hours or after conventional demetallization. Not only has total conversion been increased, but the desirable LPG and gasoline fractions have been significantly increased, while the undesirable slurry and coke products have been significantly reduced.

The results achieved using equilibrium catalyst A treated in accord with the procedures set forth in Examples 3–7 above are illustrated in Tables 10–14.

TABLE 10

| Example 3 | Steaming at 1450° F. (Hours) | | |
|---|---|---|---|
| | 0 | 4 | 16 |
| Conversion (%) | 73.9 | 65.0 | 59.8 |
| Dry Gas (%) | 3.4 | 2.4 | 2.1 |

TABLE 10-continued

| | Steaming at 1450° F. (Hours) | | |
|---|---|---|---|
| Example 3 | 0 | 4 | 16 |
| LPG (%) | 20.8 | 15.7 | 13.6 |
| Gasoline (%) | 41.3 | 44.2 | 42.0 |
| LCO (%) | 13.3 | 15.2 | 15.5 |
| Slurry (%) | 12.9 | 19.8 | 24.6 |
| Coke (%) | 8.3 | 2.7 | 2.1 |

TABLE 11

| | Steaming at 1450° F. (Hours) | | |
|---|---|---|---|
| Example 4 | 0 | 4 | 16 |
| Conversion (%) | 67.4 | 54.2 | 44.6 |
| Dry Gas (%) | 2.4 | 1.7 | 1.4 |
| LPG (%) | 18.4 | 12.9 | 9.2 |
| Gasoline (%) | 38.2 | 36.3 | 31.9 |
| LCO (%) | 13.7 | 15.3 | 15.9 |
| Slurry (%) | 19.0 | 30.5 | 39.5 |
| Coke (%) | 8.4 | 3.3 | 2.1 |

TABLE 12

| | Steaming at 1450° F. (Hours) | | |
|---|---|---|---|
| Examples | 0 | 4 | 16 |
| Conversion (%) | 66.2 | 63.5 | 55.6 |
| Dry Gas (%) | 2.0 | 1.7 | 1.5 |
| LPG (%) | 16.4 | 16.1 | 13.6 |
| Gasoline (%) | 40.4 | 42.2 | 38.1 |
| LCO (%) | 12.6 | 14.9 | 15.9 |
| Slurry (%) | 21.2 | 21.6 | 28.5 |
| Coke (%) | 7.4 | 3.6 | 2.4 |

TABLE 13

| | Steaming at 1450° F. (Hours) | | |
|---|---|---|---|
| Example 6 | 0 | 4 | 16 |
| Conversion (%) | 70.5 | 61.0 | 47.9 |
| Dry Gas (%) | 2.4 | 1.4 | 1.5 |
| LPG (%) | 18.2 | 12.1 | 11.8 |
| Gasoline (%) | 41.1 | 43.1 | 32.9 |
| LCO (%) | 14.6 | 16.7 | 16.0 |
| Slurry (%) | 14.9 | 22.3 | 36.2 |
| Coke (%) | 8.8 | 4.4 | 1.6 |

TABLE 14

| | Steaming at 1450° F. (Hours) | | |
|---|---|---|---|
| Example 7 | 0 | 4 | 16 |
| Conversion (%) | 71.2 | 62.6 | 45.9 |
| Dry Gas (%) | 2.2 | 2.3 | 1.2 |
| LPG (%) | 19.9 | 17.7 | 9.8 |
| Gasoline (%) | 39.4 | 39.0 | 33.5 |
| LCO (%) | 13.9 | 14.5 | 15.9 |
| Slurry (%) | 14.9 | 22.9 | 38.1 |
| Coke (%) | 9.7 | 3.5 | 1.5 |

Again, it is seen that total conversion has been improved with catalyst treated by each of the procedures of Examples 3–7 above, both initially and after steaming. Further, the production of desirable products, e.g., LPG and gasoline, is increased, while the production of coke is significantly reduced.

Finally, Table 15 below illustrates the improved hydrothermal stability and conversion imparted to fresh catalyst A when treated by the methods of the present invention, specifically using the method set forth in Example 2 above. After steaming at 16 hours, the total conversion rate remains above 70 percent with almost 50 percent conversion to gasoline. In fact, conversion to dry gas, LPG and gasoline exceeds 70 percent with less than 2 percent coke.

TABLE 15

| | Steaming at 1450° F. (Hours) | | |
|---|---|---|---|
| Example 2 (FRESH) | 0 | 4 | 16 |
| Conversion (%) | 85.7 | 78.7 | 71.9 |
| Dry Gas (%) | 5.4 | 3.3 | 2.2 |
| LPG (%) | 28.2 | 23.8 | 19.0 |
| Gasoline (%) | 43.8 | 48.1 | 49.0 |
| LCO (%) | 9.5 | 13.8 | 16.9 |
| Slurry (%) | 4.8 | 7.6 | 11.3 |
| Coke (%) | 8.4 | 3.5 | 1.6 |

Table 16–18 illustrate the results of similar treatments and tests using a catalyst contaminated with about 1 percent nickel and vanadium (4620 ppm Ni and 5220 ppm Vanadium) and comprising catalyst G in Table 1.

TABLE 16

| | Steaming at 1450° F. (Hours) | | |
|---|---|---|---|
| ECAT G | 0 | 4 | 16 |
| Conversion (%) | 56.8 | 43.8 | 35.3 |
| Dry Gas (%) | 2.6 | 2.4 | 2.1 |
| LPG (%) | 13.4 | 8.4 | 5.0 |
| Gasoline (%) | 35.3 | 26.0 | 19.4 |
| LCO (%) | 22.9 | 22.1 | 19.0 |
| Slurry (%) | 20.3 | 34.1 | 45.7 |
| Coke (%) | 5.5 | 6.9 | 8.9 |

TABLE 17

| | Steaming at 1450° F. (Hours) | | |
|---|---|---|---|
| Example 1 | 0 | 4 | 16 |
| Conversion (%) | 63.2 | 55.7 | 41.2 |
| Dry Gas (%) | 2.7 | 2.6 | 2.6 |
| LPG (%) | 15.5 | 11.5 | 6.9 |
| Gasoline (%) | 39.0 | 38.4 | 29.2 |
| LCO (%) | 14.7 | 17.7 | 19.3 |
| Slurry (%) | 22.1 | 26.6 | 39.5 |
| Coke (%) | 6.2 | 3.2 | 2.6 |

TABLE 18

| | Steaming at 1450° F. (Hours) | | |
|---|---|---|---|
| Calcine before Example 1 | 0 | 4 | 16 |
| Conversion (%) | 72.2 | 62.5 | 52.2 |
| Dry Gas (%) | 2.9 | 2.4 | 2.0 |
| LPG (%) | 18.9 | 13.8 | 10.0 |
| Gasoline (%) | 39.0 | 41.1 | 37.2 |
| LCO (%) | 13.6 | 16.5 | 18.1 |

TABLE 18-continued

| Steaming at 1450° F. (Hours) | | | |
|---|---|---|---|
| Calcine before Example 1 | 0 | 4 | 16 |
| Slurry (%) | 14.2 | 21.0 | 29.7 |
| Coke (%) | 11.3 | 5.2 | 2.9 |

TABLE 19

| Steaming at 1450° F. (Hours) | | | |
|---|---|---|---|
| DEMET before Example 5 | 0 | 4 | 16 |
| Conversion (%) | 72.3 | 58.8 | 44.8 |
| Dry Gas (%) | 2.3 | 2.0 | 1.9 |
| LPG (%) | 19.5 | 13.5 | 8.3 |
| Gasoline (%) | 44.8 | 40.2 | 32.2 |
| LCO (%) | 13.6 | 16.5 | 18.1 |
| Slurry (%) | 14.1 | 24.7 | 37.1 |
| Coke (%) | 5.8 | 3.1 | 2.4 |

The results obtained using equilibrium catalyst G in Table 16 may be compared with those for the same catalyst treated in accord with the present invention in Tables 17–19. In Table 17, the catalyst has been treated in accord with the method set forth in Example 1 above. In Table 18, the catalyst was calcined before treatment by the method of Example 1. Finally, in Table 19, the catalyst was subjected to a conventional demetallization process prior to treatment by the method of Example 5. In all instances, it is seen that the total conversion, both initially and after steaming, has been significantly improved. Further, the conversion to desirable products, e.g., gasoline and LPG, has been increased while the conversion to less desirable products, e.g., slurry and coke, have been reduced. In fact, production of coke has been reduced by more than two-thirds while production of gasoline has been increased by more than half.

The effect of treatment by the methods of the present invention on equilibrium catalyst C of Table 1 contaminated with about 1.6 percent nickel and vanadium (15,550 ppm Ni and 445 ppm V) has been investigated and the results reported below in Tables 20–23.

TABLE 20

| Steaming at 1450° F. (Hours) | | | |
|---|---|---|---|
| ECAT C | 0 | 4 | 16 |
| Conversion (%) | 62.3 | 50.2 | 46.5 |
| Dry Gas (%) | 1.8 | 1.7 | 1.4 |
| LPG (%) | 13.4 | 7.1 | 7.8 |
| Gasoline (%) | 38.2 | 34.5 | 33.1 |
| LCO (%) | 16.7 | 17.8 | 19.0 |
| Slurry (%) | 21.0 | 32.0 | 34.5 |
| Coke (%) | 8.9 | 6.9 | 4.2 |

TABLE 21

| Steaming at 1450° F. (Hours) | | | |
|---|---|---|---|
| Example 1 | 0 | 4 | 16 |
| Conversion (%) | 71.6 | 66.1 | 60.2 |
| Dry Gas (%) | 2.7 | 2.2 | 2.3 |
| LPG (%) | 17.4 | 15.0 | 13.7 |

TABLE 21-continued

| Steaming at 1450° F. (Hours) | | | |
|---|---|---|---|
| Example 1 | 0 | 4 | 16 |
| Gasoline (%) | 42.0 | 44.6 | 40.8 |
| LCO (%) | 15.0 | 16.6 | 17.1 |
| Slurry (%) | 13.4 | 17.3 | 22.7 |
| Coke (%) | 9.5 | 4.3 | 3.4 |

TABLE 22

| Steaming at 1450° F. (Hours) | | | |
|---|---|---|---|
| DEMET before Example 1 | 0 | 4 | 16 |
| Conversion (%) | 77.5 | 70.3 | 57.9 |
| Dry Gas (%) | 3.4 | 2.4 | 2.4 |
| LPG (%) | 25.3 | 22.6 | 16.0 |
| Gasoline (%) | 38.3 | 42.1 | 36.7 |
| LCO (%) | 12.5 | 14.7 | 16.1 |
| Slurry (%) | 10.0 | 14.9 | 26.0 |
| Coke (%) | 10.6 | 3.2 | 2.9 |

TABLE 23

| Steaming at 1450° F. (Hours) | | | |
|---|---|---|---|
| Example 5 | 0 | 4 | 16 |
| Conversion (%) | 70.1 | 60.5 | 58.0 |
| Dry Gas (%) | 2.8 | 1.8 | 2.4 |
| LPG (%) | 16.7 | 15.1 | 13.4 |
| Gasoline (%) | 39.2 | 39.6 | 39.6 |
| LCO (%) | 13.7 | 16.4 | 16.1 |
| Slurry (%) | 16.2 | 23.1 | 25.8 |
| Coke (%) | 11.5 | 4.1 | 2.6 |

Table 20 summarizes the MAT results obtained following testing of untreated equilibrium catalyst C. Compare those results with the results summarized in Tables 21–23 illustrating the same equilibrium catalyst treated in accord with the methods set forth in Example 1 or 5 above. It is readily seen that total conversion has been increased by the present invention along with increased production of the desirable fractions, e.g., LPG and gasoline, while production of less desirable coke and slurry has been reduced.

Finally, Tables 24–26 illustrate results obtained using fresh catalyst C. Table 24 illustrating the results for untreated fresh catalyst C may be compared with the results below in Tables 25 and 26. Tables 25 and 26 illustrate, respectively, fresh catalyst A treated in accord with the methods of the present invention set forth in Example 1 either alone or with prior conventional demetallization.

TABLE 24

| Steaming at 1450° F. (Hours) | | | |
|---|---|---|---|
| FRESH C | 0 | 4 | 16 |
| Conversion (%) | 87.7 | 65.8 | 57.4 |
| Dry Gas (%) | 4.1 | 1.9 | 1.3 |
| LPG (%) | 34.3 | 18.4 | 13.5 |
| Gasoline (%) | 26.7 | 42.5 | 40.7 |
| LCO (%) | 4.9 | 20.1 | 20.5 |
| Slurry (%) | 7.4 | 14.2 | 22.1 |
| Coke (%) | 22.6 | 2.9 | 1.9 |

TABLE 25

| Steaming at 1450° F. (Hours) | | | |
|---|---|---|---|
| Example 1 (Fresh) | 0 | 4 | 16 |
| Conversion (%) | 87.8 | 76.6 | 70.7 |
| Dry Gas (%) | 5.0 | 2.4 | 1.6 |
| LPG (%) | 33.8 | 20.0 | 18.1 |
| Gasoline (%) | 21.1 | 48.8 | 49.1 |
| LCO (%) | 3.2 | 13.6 | 15.0 |
| Slurry (%) | 9.0 | 9.8 | 14.2 |
| Coke (%) | 27.9 | 5.4 | 1.9 |

TABLE 26

| Steaming at 1450° F. (Hours) | | | |
|---|---|---|---|
| DEMET before Example 1 | 0 | 4 | 16 |
| Conversion (%) | 93.8 | 75.0 | 67.8 |
| Dry Gas (%) | 6.2 | 3.8 | 1.3 |
| LPG (%) | 34.9 | 21.4 | 16.5 |
| Gasoline (%) | 26.7 | 45.3 | 47.6 |
| LCO (%) | 3.8 | 13.6 | 16.5 |
| Slurry (%) | 2.4 | 11.4 | 15.7 |
| Coke (%) | 26.0 | 4.4 | 2.5 |

It is readily apparent that the methods of the present invention produce improvements to the fresh catalyst similar to those seen previously with the equilibrium catalysts. Total conversion has been increased along with production of the desirable gasoline and LPG fractions. Conversion to light crude oil and slurry have been reduced, while producing no significant change in coke.

In summary, the processes of the present invention have been shown to recover significantly higher percentages of the maximum possible activity compared to recovery with conventional demetallization processes. The combination of low deactivation rates and higher MAT conversions suggest that catalysts treated in accord with the present invention will be superior to those recovered by standard demetallization techniques in commercial applications. Thus, lower quantities of fresh catalyst will be required to maintain FCC unit activity and throughput.

The foregoing description has been directed in primary part to a particular preferred embodiment in accordance with the requirements of the Patent Statutes and for purpose of explanation and illustration. It will be apparently, however, to those skilled in the art that many modifications and changes in the specifically described methods may be made without departing from the true spirit and scope of the invention. For example, the order of steps in the method may be adjusted. For example, while it is preferred that the pH of the aqueous solution be adjusted before addition of catalyst, it is has been found that acceptable results may be achieved by adding catalyst to the aqueous solution prior to the adjustment of the pH by the addition of ammonium hydroxide. Therefore, the invention is not restricted to the preferred embodiment described and illustrated, but covers all modifications which may fall within the scope of the following claims.

What is claimed is:

1. An aqueous process for enhancing the acid sites of a spent fluid catalytic cracking (FCC) catalyst, comprising the steps of:

preparing an aqueous solution comprising water, about 0.1–3.0 percent-by-weight phosphorus selected from the group consisting of phosphoric acid, phosphorus acid and ammonium dihydrogen phosphate, and about 0.1–3.0 percent-by-weight aluminum provided by an aluminum source selected from the group consisting of the alumina trihydrates and aluminum oxide where said aluminum source has less than about 1,000 ppm chloride as a trace constituent;

adjusting the pH of said solution to about 3.0–12.0 by adding to said solution a sufficient quantity of an aqueous solution of ammonium;

adding a spent FCC catalyst to said solution in a weight ratio of about 1 part catalyst to about 1–10 parts water to produce an aqueous slurry;

stirring said slurry for a time sufficient for the pH of said slurry to stabilize; and separating said catalyst from said slurry.

2. The process of claim 1 wherein said solution further comprises about 0.1–3.0 percent-by-weight of an acid selected from the group consisting of sulfurous and sulfuric acid.

3. The process of claim 1 wherein said ammonium is selected from the group consisting of ammonium hydroxide and ammonium sulfate.

4. The process of claim 1 wherein said pH is adjusted to about 3.25–5.0.

5. The process of claim 4 wherein the concentration of said phosphorus and said aluminum in said aqueous solution is each about 0.2–1.5 percent-by-weight.

6. The process of claim 5 wherein said slurry is stirred for a time of about 3–5 minutes.

7. The process of claim 1 wherein said catalyst is added to said solution before the pH is adjusted by adding said ammonium.

8. The process of claim 1 wherein said aluminum source has less than about 200 ppm chloride as a trace constituent.

9. The process of claim 1 further comprising prior to adding said catalyst to said aqueous solution subjecting said catalyst to a demetallization process selected from the group consisting of pyrometallurgical processes, hydrometallurgical processes and both.

10. The process of claim 9 wherein said separated catalyst is washed with water.

11. The process of claim 10 wherein said wash is repeated until the eluted wash water has less than about 100 ppm chloride.

12. The process of claim 1 wherein the weight ratio of catalyst to water is about 1 to 4–10.

13. The process of claim 1 wherein said aluminum source is selected from the group consisting of gibbsite, boehmite, bayerite, diaspore and derivatives thereof.

14. An aqueous process for enhancing the acid sites of a spent fluid catalytic cracking (FCC) catalyst, comprising the steps of:

preparing an aqueous solution comprising water, about 0.7–1.0 percent-by-weight phosphorus selected from the group consisting of phosphoric acid, phosphorous acid and ammonium dihydrogen phosphate, and about a 0.7–1.0 percent-by-weight aluminum wherein said aluminum is provided by an aluminum source selected from the group consisting of aluminum trihydroxide, alumina trihydrate, gibbsite and aluminum oxide having less than about 1,000 ppm chloride as a trace constituent;

adjusting the pH of said solution to about 3.25–5.0 by adding to said solution a sufficient quantity of an aqueous solution of ammonium;

adding said spent FCC catalyst to said solution in a weight ratio of about 1 part catalyst to about 4–10 parts water in said solution to produce an aqueous slurry;

stirring said slurry for a time sufficient for the pH of said slurry to stabilize; and separating said catalyst from said slurry.

15. The process of claim 14 wherein said solution further comprises about 0.7–1.0 percent-by-weight of an acid selected from the group consisting of sulfurous and sulfuric acid.

16. The process of claim 14 wherein said concentration of phosphorus and aluminum in said aqueous solution is about 0.8 percent-by-weight and the ratio of said catalyst to said water is about 1 to 8.

17. The process of claim 16 wherein said aluminum source has less than about 200 ppm chloride as a trace constituent.

18. The process of claim 14 further comprising prior to adding said catalyst to said aqueous solution subjecting said catalyst to a demetallization process selected from the group consisting of pyrometallurgical processes, hydrometallurgical processes and both.

19. An aqueous process for enhancing the acid sites of a fluid catalytic cracking (FCC) catalyst, comprising the steps of:

preparing an aqueous solution comprising water, about 0.1–3.0 percent-by-weight phosphorus selected from the group consisting of phosphoric acid, phosphorous acid and ammonium dihydrogen phosphate, and about 0.1–3.0 percent-by-weight aluminum provided by an aluminum source selected from the group consisting of the alumina trihydrates and aluminum oxide having less than about 1,000 ppm chloride as a trace constituent;

adjusting the pH of said solution to about 3.0–12.0 by adding to said solution a sufficient quantity of an aqueous solution of ammonium;

adding an FCC catalyst to said solution in a weight ratio of about 1 part catalyst to about 1–10 parts water to produce an aqueous slurry;

stirring said slurry for a time sufficient for the pH of said slurry to stabilize; and separating said catalyst from said slurry.

20. The process of claim 19 wherein said solution further comprises about 0.1–3.0 percent-by-weight of an acid selected from the group consisting of sulfurous and sulfuric acid.

21. The process of claim 19 wherein said ammonium is selected from the group consisting of ammonium hydroxide and ammonium sulfate.

22. The process of claim 21 wherein said pH is adjusted to about 3.25–5.0.

23. The process of claim 19 wherein said catalyst is added to said solution before the pH is adjusted by adding said ammonium.

24. The process of claim 19 wherein said alumina source is selected from the group consisting of gibbsite, boehmite, bayerite, diaspore and derivatives thereof.

25. The process of claim 19 wherein said aluminum source has less than about 200 ppm chloride as a trace constituent.

26. The process of claim 19 wherein said catalyst is selected from the group consisting of fresh catalyst and spent catalyst.

* * * * *

UNITED STATES PATENT AND TRADEMARK OFFICE
CERTIFICATE OF CORRECTION

PATENT NO : 6,034,017
DATED : March 7, 2000
INVENTOR(S): Stephen K. Pavel

It is certified that error appears in the above-identified patent and that said Letters Patent are hereby corrected as shown below:

In the title, delete "Phosphrus" and insert therefor --Phosphorus--

Signed and Sealed this

Twenty-fourth Day of April, 2001

Attest:

NICHOLAS P. GODICI

Attesting Officer      Acting Director of the United States Patent and Trademark Office